Patented Sept. 20, 1927.

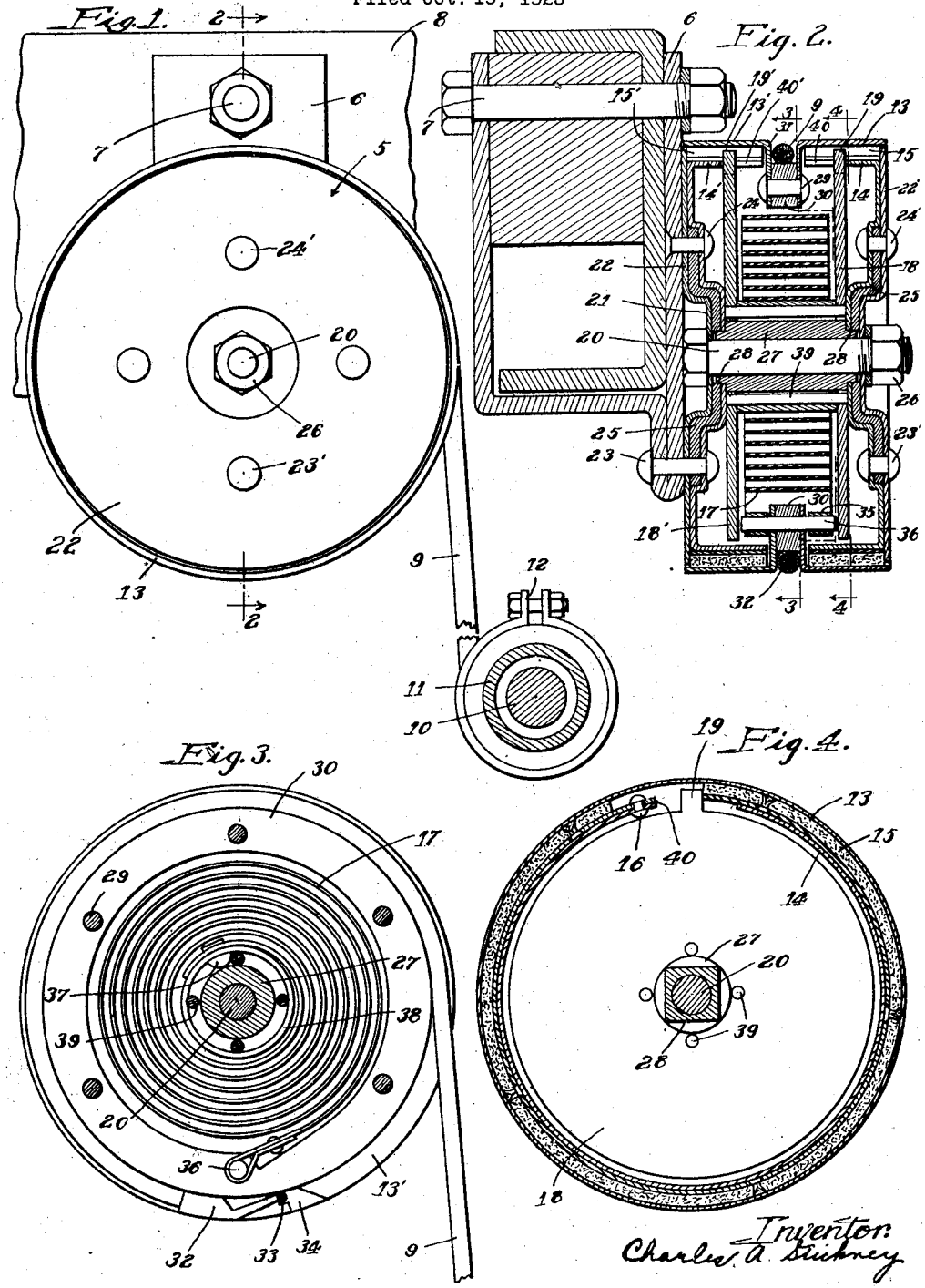

1,642,902

UNITED STATES PATENT OFFICE.

CHARLES A. STICKNEY, OF ROCKFORD, ILLINOIS, ASSIGNOR TO ROCKFORD DRILLING MACHINE COMPANY, OF ROCKFORD, ILLINOIS, A CORPORATION OF ILLINOIS.

SHOCK ABSORBER.

Application filed October 19, 1925. Serial No. 63,206.

This invention relates to shock absorbers for motor vehicles.

One of the principal objects of the invention is to provide a simplified and generally improved shock absorber operating to allow free deflection of the vehicle springs when the wheels pass over rough places in the road but serving to retard or check the rebound or recoil action of the springs, the means employed consisting preferably of an internal expanding brake band operating inside an external rotary drum and mounted so it wraps or contracts when the drum turns in one direction in the deflection of the vehicle springs, but unwraps or expands into tight frictional braking engagement with the drum when the latter turns in the opposite direction in the rebound.

Another important object is the provision of an internal expanding brake band supported on the outside of a stationary drum and having an external rotary drum supported directly by its contact on the brake band, the arrangement obviating the necessity for lubrication at any point in the entire structure and providing a device which is immune to the action of moisture and dirt so far as its efficient operation is concerned, although the construction of the device is such as practically to preclude moisture or dirt from entering.

Still another important object of this invention is the provision in connection with the rotary drum and the internal expanding brake band, of a single torsion spring serving the double purpose of retrieving the flexible cable winding on the drum, and maintaining constantly a certain pressure on the brake band tending to expand the same into close frictional contact with the inside of the drum. It is a further feature of my invention to arrange the spring with reference to the drum and brake band so that very little pressure is applied to expand the brake band during the deflection of the vehicle springs, when the flexible cable is being retrieved in the unwinding of the torsion spring, and whereby, on the rebound, when the torsion spring is rewound, it exerts increasingly greater pressure on the brake band to expand the same into closer frictional contact with the drum. The latter feature enables adapting my shock absorbers to cars of different weight since the initial spring tension may be adjusted to secure different degrees of snubbing effects.

Still another feature of the invention is to provide a shock absorber constructed so far as practicable of stamped or drawn sheet metal parts with a view to securing a more compact, light and economical device.

The foregoing and other objects of the invention are pointed out in the following detailed description in which reference is made to the accompanying drawing illustrating my invention. In the drawing Fig. 1 is a side view of a shock absorber made in accordance with my invention shown mounted on a chassis part of a motor vehicle and connected with the axle or axle housing or other relatively movable part of the vehicle;

Fig. 2 is a central vertical cross section through Fig. 1 taken on the line 2—2 thereof;

Fig. 3 is a transverse vertical section taken on the line 3—3 of Fig. 2; and

Fig. 4 is another similar section taken on the line 4—4 of Fig. 2.

All of the sections are taken looking in the direction of the small arrows and throughout the views the same reference numerals are applied to corresponding parts.

Referring to the drawing, the shock absorber 5 is supported on a hanger 6 bolted, as shown at 7, or secured in any other manner, to the chassis frame 8 or some other part moving with the chassis. The flexible cable or strap 9 of the shock absorber extends therefrom for connection with the axle 10. In the illustration one end of the cable 9 is shown wrapped about the axle housing 11 and secured by a suitable clamping device 12. The operation of shock absorbers, snubbers, and similar retarding or checking devices used on motor vehicles is quite commonly known, so that it will suffice to state at this point that, in the deflection of the vehicle springs caused by the wheels passing over a rough place in the road, the chassis 8 moves freely toward the axle 10 and suitable means is provided in the shock absorber 5 to take up the slack in the cable 9. Then, on the rebound, when the chassis 8 moves away from the axle 10 under the recoil or rebound action of the supporting springs, the shock absorber is operated to check the movement of the chassis.

Referring for the present more particularly to Figs. 3 and 4, the shock absorber comprises essentially an outer rotary drum 13, an inner fixed drum 14, and an internal expanding brake band 15, supported throughout its length on the outside of the inner fixed drum 14 and frictionally engaging the inner periphery of the outer drum 13. The brake band is fixed at the one end, as shown at 16, by rivets passing through the flange of the drum 14, and has its other end free. A spiral torsion spring 17 is arranged normally to tend to turn a disc 18 in one direction under varying torque, there being a certain initial or residual torque in the spring in the most unwound condition thereof. The disc 18 tends to turn in a clockwise direction, as seen in Fig. 4, and causes the lug 19 thereof to bear upon the free end of the brake band 15 to tend to expand the same into close frictional contact with the internal periphery of the outer drum 13. The spring 17 furthermore tends normally to turn the drum 13 in a counter-clockwise direction, as seen in Fig. 4, normally to retrieve the cable 9. When a deflection of the vehicle springs occurs and the chassis 8 and the axle 10 move toward each other, the drum 13 turns in a counter-clockwise direction and winds up the cable 9 to permit no slack to occur therein. Obviously, during this operation the torque of the spring 17 is partly dissipated, and, as a result, the pressure with which the lug 19 engages the free end of the brake band is somewhat lighter; never, however, reaching a zero value. On the rebound, the spring is rewound in the unreeling of the cable, and, consequently, the resulting greater torque of the spring is accompanied with greater pressure applied to the free end of the brake band by the lug 19. Furthermore, it will be seen that the torque stored in the spring increases proportionally the farther apart the chassis 8 and the axle 10 become, so that there is an accompanying greater braking effect exerted by the brake band 15, as a result of the increasing pressure of the lug 19 as the spring is wound up more and more. From the description thus far advanced, it will appear that there is relatively no braking or retarding effect produced by the shock absorber during the deflection of the vehicle springs. This is due partly to the fact that there is relatively little pressure applied by the lug 19 to the free end of the brake band, because of the unwound condition of the spring 17, which, as a matter of fact, exerts less and less torque the more the chassis 8 approaches the axle 10. More particularly, however, this is due to the fact that the drum 13 rotates in a counter-clockwise direction and there is a tendency for the brake band to wind up or contract. Were it not for the pressure applied by the lug 19, the band would lie practically free of the drum but, as it is, it exerts only a slight frictional drag of no appreciable effect. On the rebound the drum turns in a clockwise direction and two factors enter to communicate a heavy braking or retarding effect; the increased and increasing torque of the spring 17 results in a relatively heavy pressure of the lug 19 on the free end of the brake band tending to expand the same, but, more particularly, in this reversed rotation of the drum 13, the brake band, instead of winding up and contracting as before, tends now to unwrap or expand into a very intimate and binding contact with the internal periphery of the drum 13. As a matter of fact the greater the frictional contact occurring between the band and the drum, the more will be the unwrapping and expanding effect produced, so that there is a building up of braking action reaching very effective proportions. The farther the chassis 8 becomes removed from the axle 10, the greater the torque of the spring 17 becomes, and, as a result, there is increasing pressure of the lug 19 on the free end of the brake band to secure more and more retarding or checking action.

I have chosen to set forth thusly, in a general way, the operation of my device inasmuch as I realize that the principle involved is important apart from the details of any form of structure which may be devised to embody the operations described. The following detailed description of a particular embodiment of my invention will not therefore be understood as limiting the invention in any wise to the particular details illustrated. The inner fixed drum I prefer to provide in two sections 14 and 14', mounted on the opposite ends of a stud 20 projecting from the side of the hanger 6. The stud 20 is in the form of a bolt the head of which sets in a depression 21 in a side plate 22, between the plate 22 and the side of the hanger 6. The plate 22 is riveted, as shown at 23 and 24, with the drum section 14' to the hanger 6, an intermediate strengthening washer 25 being interposed between the plate 22 and the drum 14 as illustrated. The parts just referred to are stamped or drawn sheet metal. The drum section 14, in a similar manner, is riveted at 23' and 24' to the opposite side plate 22' and has an intermediate strengthening member 25, interposed between the drum section and the side plate. A nut 26 threading on the stud 20 secures the drum sections against relative rotation and in rigidly spaced relation on the opposite ends of a sleeve 27, fitting about the stud 20 and having reduced squared ends 28 fitting in square openings in the drum sections. The drum section 14', being riveted with the hanger 6, the section 14 is maintained in the same relation through the medium of the sleeve 27, in an obvious manner. The outer drum I prefer to provide in two sections 13 and 13′, of cupped form similarly as the inner drum sections 14 and 14′, and formed of sheet metal in a similar manner. The drum sections are riveted, as shown at 29, to the opposite sides of a ring 30, leaving between the drum sections an annular recess 31 for the reception of the cable 9. The latter has a clip 32 thereon having a T head 33 to engage in bayonet slots 34 in the opposite side walls of the groove provided by the drum sections. The brake band is also provided in two sections 15 and 15′, disposed between the inner and outer brake drum sections. The spring 17 has its outer end forked, as indicated at 35, to receive a crosspin 36 passing through the ring 30 and the inturned flanges of the drum sections 13 and 13′, whereby to connect the one end of the spring 17 with the outer brake drum. The inner end of the spring 17 is riveted, as shown at 37, to a tube 38. The latter surrounds a plurality of pins 39 extending crosswise between the tube 38 and the sleeve 27, and engaging in openings provided therefor in the discs 18 and 18′. The head of the rivet or rivets 37 engages one of the pins 39 to communicate pressure in a clockwise direction, as the pins are seen in Fig. 3, and thereby to exert a yielding pressure tending to turn the discs 18 and 18′ in a clockwise direction, as seen in Fig. 4. The lugs 19 and 19′ of the discs are received in elongated notches 40 and 40′ in the inturned flanges of the drum sections 14 and 14′ and arranged to have a certain degree of free movement therein while in engagement with the ends of the brake bands 15 and 15′ respectively, in the manner above described. The discs 18 and 18′ are free to turn on the sleeve 27 so that whatever torque resides in the spring 17 is communicated to the discs and through them to the free ends of the brake bands to expand the same in a manner previously described.

The operation of the device was described in detail in a preceding paragraph and it will not be necessary to enlarge on that description except to point out features relating to the structure of my improved shock absorber not previously referred to. It will be seen that the provision of an internal drum, and an external drum riding on and supported by an internal expanding brake band, in turn supported on the inner drum, dispenses with the usual provision of relatively moving parts which require lubrication. The only relatively moving parts are the outer drum and the brake band. These, obviously, should have no lubrication. Furthermore, all of the operating parts are fully enclosed so that dirt and moisture are practically excluded. However, such dirt or moisture as will enter the device, will not affect its operation in any manner, unless perhaps to increase the snubbing, retarding, or checking action by virtue of the increased friction resulting between the relatively moving parts. These, as stated before, are only the outer drum and the brake band. The only parts subject to wear are, of course, the brank band, and, to a small degree, the outer drum. The arrangement of two outer drum sections and two brake band sections to either side of the operating cable affords a maximum friction surface. The provision, so far as practicable, of stamped and drawn parts tends toward compactness, lightness, and cheapness, as well as durability.

I claim:

1. In a shock absorber, a revoluble drum mounted on one of two relatively movable members, a flexible element affixed to and winding on said drum and affixed at its free end to the other member, spring means normally turning said drum in one direction to take up slack in said flexible element, and a brake band operating on said drum and held normally by said spring means toward braking engagement with said drum, said band being operable under slight unappreciable load existing in said spring means during a deflection of the vehicle springs which is accompanied with a moving together of said aforementioned members, and being operable under a heavier load existing in said spring means during a rebounding movement, which is accompanied with a moving apart of the aforementioned members.

2. In a shock absorber, a revoluble drum mounted on one of two relatively movable members, a flexible element affixed to and winding on said drum and affixed at its free end to the other member, spring means normally turning said drum in one direction to take up slack in said flexible element, and a brake band operating on said drum and held normally by said spring means toward braking engagement with said drum, said band being operable under slight unappreciable load existing in said spring means during a deflection of the vehicle spring, which is accompanied with a moving together of said aforementioned members, and being operable under a heavier appreciable load existing in said spring means during a rebounding movement, which is accompanied with a moving apart of the aforementioned members, the loading of said spring means increasing with the movement of said members farther apart and giving a resulting increased braking effect through said brake band.

3. In a shock absorber, the combination of an internal expanding brake mechanism, a support therefor, an external drum rotatably supported by the brake mechanism, a flexible element affixed to said drum and winding thereon and affixed at its free end to a part movable with reference to said shock absorber, and spring means normally turning said drum in one direction to take up slack in said flexible element, said brake mechanism being non-effective during the winding up of the flexible element in a deflection of the vehicle springs but being effective on the unreeling thereof during rebound, the effectiveness or non-effectiveness of said brake mechanism depending partly on the existence of tension in said spring means.

4. In a shock absorber, the combination of an internal expanding brake mechanism, a support therefor, an external drum rotatably supported by the brake mechanism, a flexible element affixed to said drum and winding thereon and affixed at its free end to a part movable with reference to said shock absorber, and spring means normally turning said drum in one direction to take up slack in said flexible element, said brake mechanism being non-effective during the winding up of the flexible element in a deflection of the vehicle springs but being effective on the unreeling thereof during rebound, the effectiveness or non-effectiveness of said brake mechanism depending partly on the existence of tension in said spring means, and being less and less effective in the course of the deflection movement, due to there being less and less tension in the spring means, and being more and more effective in the course of a rebound movement, due to there being more and more tension in the spring means.

5. In a shock absorber, the combination of a fixed support, a drum rotatable with respect thereto, an internal brake band mounted on said support and operating on the internal periphery of said drum, a flexible element affixed to and winding on said drum and having its free end affixed to a part movable with respect to said shock absorber, spring means normally turning said drum in one direction to take up slack in said flexible element, means for fixing one end of said brake band, and means operating under the load stored in said spring means for yieldingly engaging the free end of said band to exert a tendency for expanding the same.

6. In a shock absorber, the combination of an inner stationary drum, an outer telescoping rotatable drum, a brake band supported between said drums fixed at one end to the outside of said stationary drum and arranged to expand into operating engagement with the inner periphery of said outer drum, a flexible element winding on and fixed to said outer drum and having its free end affixed to a part movable with respect to said shock absorber, a torsion spring having one end fixed to and movable with the outer drum tending normally to turn the same in one direction to retrieve said flexible element, and a part operated by the other end of said spring into engagement with the free end of said brake band tending normally to move the end of said band in a direction to expand the same into operating engagement with said outer drum.

7. In a shock absorber, the combination of an inner stationary drum, an outer telescoping rotatable drum, a brake band supported between said drums fixed at one end to the outside of said stationary drum and arranged to expand into operating engagement with the inner periphery of said outer drum, a flexible element winding on and fixed to said outer drum and having its free end affixed to a part movable with respect to said shock absorber, a torsion spring having one end fixed to and movable with the outer drum tending normally to turn the same in one direction to recoil said flexible element, and a part operated by the other end of said spring into engagement with the free end of said brake band tending normally to move the end of said band in a direction to expand the same into operating engagement with said outer drum, said spring in operation exerting less and less pressure on said part as it turns said drum to recoil said flexible element during deflection of the vehicle springs and exerting more and more pressure on said band as said drum turns to unreel the flexible element in the rebound of the vehicle.

8. In a shock absorber, the combination of a pair of inner drums spaced laterally with their flanges facing, a pair of telescoping outer drums having their flanges extending in opposed relation concentric with the flanges of said inner drums, a pair of brake bands between said drums having their one ends fixed to the inner drums, a pair of discs having lugs engaging the free ends of said brake bands to move the same in one direction to expand the bands into operating engagement with the inside of said outer drums, a torsion spring having one end fixed to and movable with the outer drums and having its other end urging said discs in a direction to expand said bands, and a flexible element having one end fixed to said outer drums and having its other end affixed to a part movable with respect to said shock absorber to turn said drums in one direction against the action of said spring when said part moves with respect to said shock absorber.

9. In a shock absorber, the combination of a pair of inner drums spaced laterally with their flanges facing, a pair of telescoping outer drums with their flanges extending in opposed relation concentric with the flanges of said inner drums, a pair of brake bands between said drums having their one ends fixed to the inner drums, a pair of discs having lugs engaging the free ends of said brake bands to move the same in one direction to expand the bands into operating engagement with the inside of said outer drums, a torsion spring having one end fixed to and movable with the outer drums and having its other end urging said discs in a direction to expand said bands, and a flexible element having one end fixed to said outer drums and having its other end affixed to a part movable with respect to said shock absorber to turn said drums in one direction against the action of said spring when said part moves with respect to said shock absorber, said outer drums being connected but arranged in laterally spaced relation leaving an annular recess therebetween on the outside of said shock absorber for the reception of said flexible element.

10. In a shock absorber, a hanger to serve as a fixed support, a pair of inner drums mounted in fixed spaced relation on said hanger with their flanges facing, a pair of outer movable drums fixed together between said inner drums with their flanges extending in opposed relation and in concentric relation with the flanges of said inner drums, brake bands fixed at one end on each of said inner drums and lying between said inner and outer drums, a pair of laterally spaced and relatively fixed discs having lugs engaging the free ends of said brake bands to move the same in one direction to expand said bands into operating engagement with said outer drums, a torsion spring mounted between said discs with its outer end fixed to said outer drums and its inner end connected with said discs to move the same normally in one direction to expand said brake bands, and a flexible element having one end fixed to said outer drums and having its other end affixed to a part movable with respect to said shock absorber.

11. In a shock absorber, the combination of an inner drum, an outer drum telescoping therewith, said drums being mounted for relative rotation with respect to one another, one of said drums being mounted on one of two relatively movable members and the other of said drums having connection with the other of the two relatively movable members whereby to produce relative rotation of the drums when the members move with respect to one another, spring means arranged to be placed under load when the members move apart, a brake band mounted on one of said drums and frictionally engaging the other of said drums, and means connecting said band with said spring means whereby an increase in the load on the spring means increases the braking action of the band.

12. In a shock absorber, the combination of two relatively rotatable telescoping drums, one of said drums being mounted on one of two relatively movable members and the other of said drums having connection with the other of the two relatively movable members whereby said drums are arranged to have relative rotation in the movement of one member relative to the other, an expanding brake band mounted on the inner drum for frictionally engaging the outer drum to exert a braking action, spring means placed under load when the relatively movable members move apart, and means subject to the load of said spring means acting to expand said brake band toward braking engagement.

13. In a shock absorber, the combination of a pair of relatively rotatable telescoping drums, one of said drums being mounted on one of two relatively movable members and the other of said drums being connected with the other of the two relatively movable members whereby to produce relative rotation of said drums in the movement of one member relative to the other, an internal expanding brake band mounted on the inner drum to have frictional engagement with the inside of the outer drum, and means for fixing one end of said band to the inner drum, the other end of said band being free for expansion or contraction of the band, said band being arranged with respect to said drums whereby when the outer drum turns in one direction in the deflection of the vehicle springs said band tends to wrap and consequently contract so as to exert little or no braking effect but arranged when the outer drum is turned in the opposite direction during a rebounding movement to tend to unwrap and consequently expand so as to exert a braking action.

14. In a shock absorber, the combination of a pair of relatively rotatable telescoping drums, one of said drums being mounted on one of two relatively movable members and the other of said drums being connected with the other of the two relatively movable members whereby to produce relative rotation of said drums in the movement of one member relative to the other, an internal expanding brake band mounted on the inner drum to have frictional engagement with the inside of the outer drum, means for fixing one end of said band to the inner drum, the other end of said band being free for expansion or contraction of the band, said band being arranged with respect to said drums whereby when the outer drum turns in one direction in the deflection of the vehicle springs said band tends to wrap and consequently contract so as to exert little or no braking effect but arranged when the outer drum is turned in the opposite direction during a rebounding movement to tend to unwrap and consequently expand so as to exert a braking action, spring means normally tending to turn the one drum relative to the other and arranged during the rebounding movement to be placed under increasing load as the relatively movable members move apart, and means operating under the load stored in said spring means for yieldingly urging the free end of said brake band in a direction to expand the band to increase the braking action thereof.

In witness of the foregoing I affix my signature.

CHARLES A. STICKNEY.